(12) United States Patent
Reis et al.

(10) Patent No.: US 8,481,203 B2
(45) Date of Patent: Jul. 9, 2013

(54) INTEGRATED ENERGY STORAGE UNIT

(75) Inventors: Antonio Reis, Modesto, CA (US); David K. Whitmer, Center Valley, PA (US); Milburn Ebenezer Jacob Muthu, Breinigsville, PA (US); Shanthi K. Korutla, Morton, PA (US)

(73) Assignee: Bren-Tronies Batteries International, L.L.C., Commack, NY (US)

( * ) Notice: Subject to any disclaimer, the term of this patent is extended or adjusted under 35 U.S.C. 154(b) by 164 days.

(21) Appl. No.: 12/699,110

(22) Filed: Feb. 3, 2010

(65) Prior Publication Data

US 2011/0189533 A1   Aug. 4, 2011

(51) Int. Cl.
*H01M 2/00* (2006.01)
*H01M 2/02* (2006.01)

(52) U.S. Cl.
USPC .................. 429/178; 429/188; 429/7; 429/9

(58) Field of Classification Search
USPC .................. 429/9, 178, 7, 163, 188; 361/500
See application file for complete search history.

(56) References Cited

U.S. PATENT DOCUMENTS

| | | | |
|---|---|---|---|
| 3,630,782 A | 12/1971 | Butler | |
| 3,811,944 A | 5/1974 | Liang et al. | |
| 5,403,679 A | 4/1995 | Stone | |
| 5,439,756 A * | 8/1995 | Anani et al. | 429/9 |
| 5,587,250 A | 12/1996 | Thomas et al. | |
| 5,670,266 A | 9/1997 | Thomas et al. | |
| 5,738,919 A | 4/1998 | Thomas et al. | |
| 5,764,504 A | 6/1998 | Brand et al. | |
| 5,849,426 A | 12/1998 | Thomas et al. | |
| 5,901,057 A | 5/1999 | Brand et al. | |
| 5,916,699 A | 6/1999 | Thomas et al. | |
| 6,040,982 A | 3/2000 | Gandre et al. | |
| 6,061,577 A | 5/2000 | Andrieu et al. | |
| 6,117,585 A | 9/2000 | Anani et al. | |
| 6,181,545 B1 | 1/2001 | Amatucci et al. | |
| 6,252,762 B1 | 6/2001 | Amatucci | |
| 6,262,894 B1 | 7/2001 | Nelson et al. | |
| 6,373,152 B1 | 4/2002 | Wang et al. | |
| 6,387,553 B1 | 5/2002 | Putt et al. | |
| 6,392,901 B1 | 5/2002 | Colver et al. | |
| 6,403,266 B1 * | 6/2002 | Kim et al. | 429/314 |
| 6,459,566 B1 | 10/2002 | Casby et al. | |
| 6,517,972 B1 | 2/2003 | Amatucci | |
| 6,521,382 B1 * | 2/2003 | Song et al. | 429/309 |
| 6,576,365 B1 | 6/2003 | Meitav et al. | |
| 6,628,107 B1 | 9/2003 | Bang et al. | |
| 6,728,096 B1 * | 4/2004 | Smith et al. | 361/523 |

(Continued)

OTHER PUBLICATIONS

U.S. Appl. No. 12/699,141, filed Feb. 3, 2010.

*Primary Examiner* — Joseph S Del Sole
*Assistant Examiner* — Nahida Sultana
(74) *Attorney, Agent, or Firm* — Keusey & Associates, P.C.

(57) ABSTRACT

An integrated energy storage unit includes a container and a battery housed within the container. The battery includes a positive battery terminal, a negative battery terminal, and a battery electrolyte. A capacitor is housed within the container, separate from the battery. The capacitor includes a positive capacitor terminal, a negative capacitor terminal, and a capacitor electrolyte. A plurality of connectors electrically couple the battery and the capacitor in parallel. A positive lead is electrically coupled to the positive battery terminal and the positive capacitor terminal. The positive lead extends from the container. A negative lead is electrically coupled to the negative battery terminal and the negative capacitor terminal. The negative lead extends from the container.

13 Claims, 4 Drawing Sheets

U.S. PATENT DOCUMENTS

| | | |
|---|---|---|
| 6,773,848 B1 | 8/2004 | Nortoft et al. |
| 6,790,556 B1 | 9/2004 | Meitav et al. |
| 6,833,983 B2 | 12/2004 | Nguyen et al. |
| 6,923,837 B2 | 8/2005 | Longhi, Jr. et al. |
| 6,952,338 B1 | 10/2005 | Gallay et al. |
| 6,960,842 B2 | 11/2005 | Ziegler et al. |
| 7,186,473 B2 | 3/2007 | Shiue et al. |
| 7,230,352 B2 | 6/2007 | Bedard et al. |
| 7,379,305 B2 | 5/2008 | Briggs et al. |
| 7,410,725 B2 | 8/2008 | Meitav et al. |
| 7,481,852 B2 | 1/2009 | Longhi, Jr. et al. |
| 7,514,164 B2 | 4/2009 | Walter |
| 7,675,740 B2 | 3/2010 | Rasmussen et al. |
| 7,781,914 B2 | 8/2010 | Kotlyar et al. |
| 2002/0114982 A1 | 8/2002 | Putt et al. |
| 2002/0182454 A1 | 12/2002 | Autenrieth et al. |
| 2003/0035982 A1 | 2/2003 | Ryu et al. |
| 2003/0129458 A1 | 7/2003 | Bailey |
| 2003/0134158 A1 | 7/2003 | Kung |
| 2003/0151875 A1 | 8/2003 | Nguyen et al. |
| 2003/0162086 A1 | 8/2003 | Longhi, Jr. et al. |
| 2004/0038087 A1 | 2/2004 | Shiue et al. |
| 2004/0155634 A1* | 8/2004 | Sasaki ............................ 323/263 |
| 2004/0161640 A1 | 8/2004 | Salot |
| 2005/0031954 A1 | 2/2005 | Meitav et al. |
| 2005/0105226 A1 | 5/2005 | Bedard et al. |
| 2005/0175876 A1 | 8/2005 | Walter |
| 2005/0214598 A1 | 9/2005 | Longhi, Jr. et al. |
| 2005/0249985 A1 | 11/2005 | Muller et al. |
| 2006/0127704 A1* | 6/2006 | Raiser ................................ 429/9 |
| 2006/0158037 A1 | 7/2006 | Danley et al. |
| 2006/0263649 A1 | 11/2006 | Sohn |
| 2007/0009770 A1* | 1/2007 | Takada et al. ...................... 429/9 |
| 2007/0104981 A1 | 5/2007 | Lam et al. |
| 2007/0111044 A1* | 5/2007 | Chang ................................ 429/9 |
| 2007/0128472 A1 | 6/2007 | Tierney et al. |
| 2007/0166574 A1 | 7/2007 | Nakashima et al. |
| 2007/0230094 A1 | 10/2007 | Carlson |
| 2008/0090141 A1 | 4/2008 | Meitav et al. |
| 2008/0199737 A1 | 8/2008 | Kazaryan et al. |
| 2009/0025207 A1 | 1/2009 | Youker |
| 2009/0110214 A1 | 4/2009 | Litovsky |
| 2009/0136834 A1 | 5/2009 | Coowar et al. |
| 2009/0148759 A1 | 6/2009 | Mitsuda et al. |
| 2010/0248041 A1* | 9/2010 | Kikuchi et al. ............... 429/342 |
| 2010/0300780 A1* | 12/2010 | Caruso et al. ............... 180/65.21 |
| 2011/0206950 A1* | 8/2011 | Doege ................................ 429/9 |

* cited by examiner

INTEGRATED ENERGY STORAGE UNIT

CROSS-REFERENCE TO RELATED APPLICATIONS

U.S. patent application Ser. No. 12/699,141, filed on Feb. 3, 2010, is incorporated herein by reference in its entirety.

FIELD OF INVENTION

The present invention relates to an energy storage unit that integrates a lithium ion battery and a capacitor.

BACKGROUND

Capacitors may be used in combination with batteries to support high power demands, such as, for example, in hybrid or electric vehicles, which require a large amount of power for quick acceleration. A battery alone, which is slow to respond due to the slow mobility of ions within the battery, cannot provide the quick release of power required to meet the demands of acceleration. Capacitors have been electrically coupled to batteries to provide power from the battery to charge the capacitor so that the capacitor can provide the quick release of power required for acceleration.

It would be beneficial to provide a single unit that provides increased electrical performance over existing current battery/capacitor assemblies.

SUMMARY OF THE PRESENT INVENTION

Briefly, the present invention provides an integrated energy storage unit comprising a container and a battery housed within the container. The battery comprises a positive battery terminal, a negative battery terminal, and a battery electrolyte. A capacitor is housed within the container, separate from the battery. The capacitor comprises a positive capacitor terminal, a negative capacitor terminal, and a capacitor electrolyte. A plurality of connectors electrically couples the battery and the capacitor to each other in parallel. A positive lead is electrically coupled to the positive battery terminal and the positive capacitor terminal. The positive lead extends from the container. A negative lead is electrically coupled to the negative battery terminal and the negative capacitor terminal. The negative lead extends from the container.

The present invention also provides an integrated energy storage unit comprising a container and a battery assembly comprising a plurality of batteries housed within the container. The plurality of batteries is electrically coupled together in parallel or series. A capacitor assembly comprises a plurality of capacitors housed within the container, separate from the plurality of batteries. The plurality of capacitors is electrically coupled together in series. The battery assembly and the capacitor assembly are electrically coupled to each other in parallel.

Further, the present invention provides an integrated energy storage unit comprising a plurality of batteries electrically coupled together in parallel. Each of the plurality of batteries is housed in its own battery pouch. A plurality of capacitors is electrically coupled together in series. Each of the plurality of capacitors is housed in its own capacitor pouch. The plurality of batteries is electrically coupled to the plurality of capacitors in parallel.

The present invention also provides a method of assembling an integrated energy storage unit comprising the steps of manufacturing a battery having a positive battery terminal and a negative battery terminal; manufacturing a capacitor separate from the battery, the capacitor having a positive capacitor terminal and a negative capacitor terminal; electrically coupling the positive battery terminal and the positive capacitor terminal to each other; electrically coupling the negative battery terminal and the negative capacitor terminal to each other; and simultaneously charging the battery and the capacitor from a charge source.

The present invention further comprises a method of assembling an integrated energy storage unit comprising the steps of inserting positive battery plates and negative battery plates into a battery pouch; inserting positive capacitor plates and negative capacitor plates into a capacitor pouch; electrically coupling the positive battery plates and the positive capacitor plates to each other; electrically coupling the negative battery plates and the negative capacitor plates to each other; adding a battery electrolyte to the battery pouch; adding a capacitor electrolyte to the capacitor pouch; and simultaneously forming the battery and the capacitor from a charge source.

The present invention also provides an integrated energy storage unit manufactured by the process recited above.

BRIEF DESCRIPTION OF THE DRAWINGS

The foregoing summary, as well as the following detailed description of the invention, will be better understood when read in conjunction with the appended drawings. For the purpose of illustrating the invention, there is shown in the drawings certain embodiments of the present invention. It should be understood, however, that the invention is not limited to the precise arrangements and instrumentalities shown.

In the drawings.

DETAILED DESCRIPTION OF THE PRESENT INVENTION

In describing the embodiments of the invention illustrated in the drawings, specific terminology will be used for the sake of clarity. However, the invention is not intended to be limited to the specific terms so selected, it being understood that each specific term includes all technical equivalents operating in similar manner to accomplish similar purpose. As used herein, devices are "electrically coupled" to each other when a path is provided for a transfer of electrons between the devices. Also, a "battery" may be comprised of a single cell or multiple cells. It is understood that the drawings are not drawn to scale.

The following describes particular examples of embodiments of the present invention. It should be understood, however, that the invention is not limited to the embodiments detailed herein. Generally, the following disclosure refers to an integrated energy storage unit and a method of manufacturing and energizing the unit.

The inventive integrated energy storage unit includes at least one capacitor coupled in parallel to at least one battery to form a hybrid cell. In an exemplary embodiment, the battery is a rechargeable lithium-ion battery, although those skilled in the art will recognize that other types of batteries, such as, for example, a lead acid or NiMH battery, may be used within the scope of the present invention. The inventive integrated energy storage unit may be used in applications ranging from Hybrid Electric Vehicles (HEV), Plug-in Hybrid Electric Vehicles (PHEV), and Electric Vehicles (EV). The inventive integrated energy storage unit may also be used as an energy storage system for various applications, such as, for example, Uninterrupted Power Supply (UPS), telecommunications, and power regulation. Further, the inventive integrated energy storage unit may be used wherever power may be instantaneously required. Additionally, the inventive integrated energy storage unit may be considered as an extended energy storage unit, as it provides extended energy for operating, among other things, the above-referenced devices.

Figure 1:
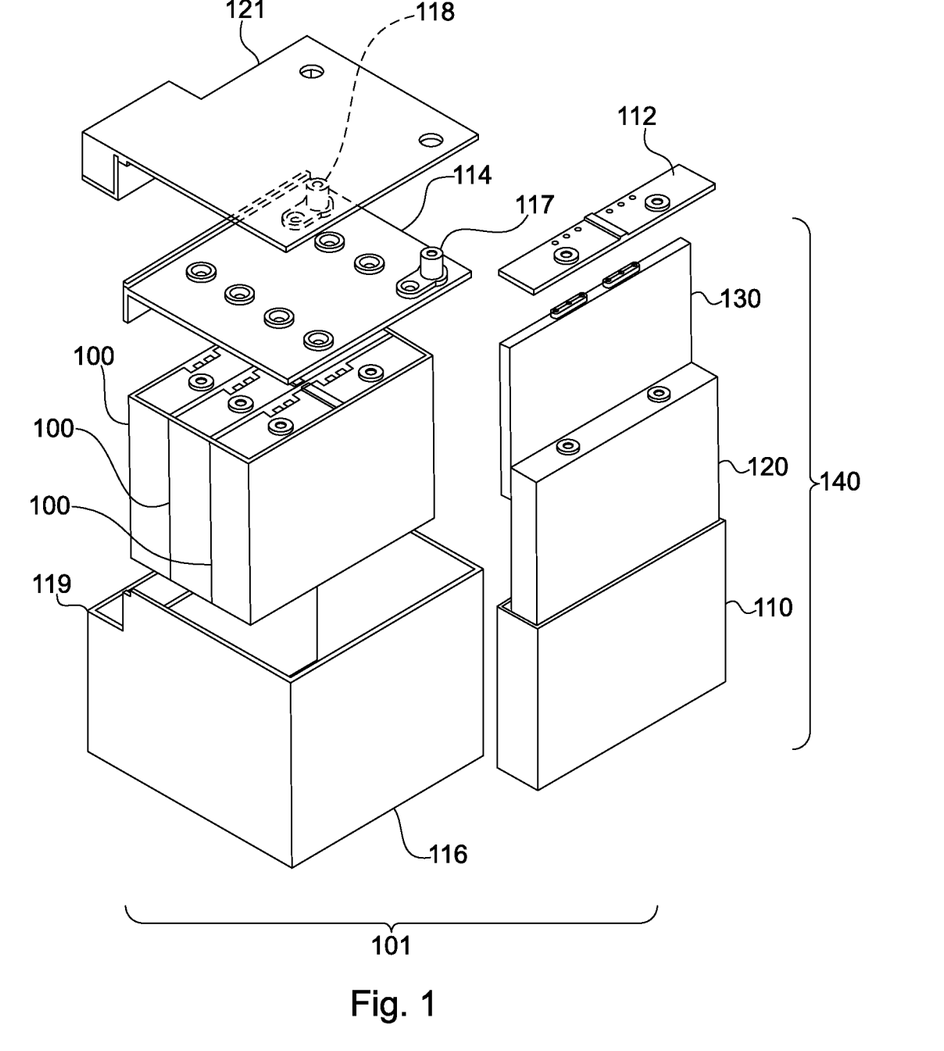
FIG. 1 is an exploded perspective view of a battery employing a plurality of integrated energy storage unit according to a first exemplary embodiment of the present invention.
Figure 2:
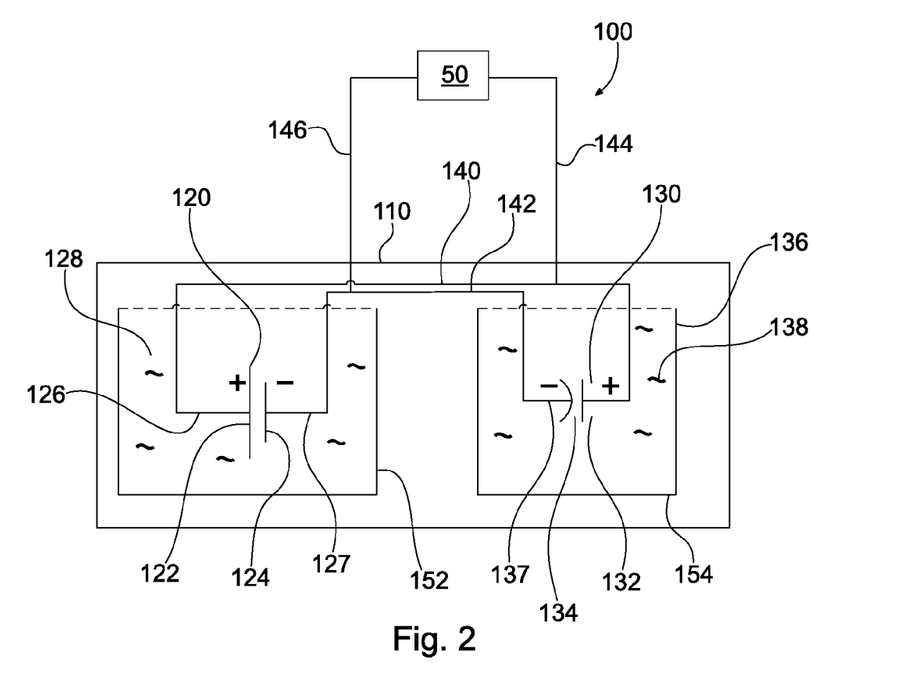
FIG. 2 is an electrical schematic drawing of the integrated energy storage unit according to the first exemplary embodiment of the present invention.

Referring to FIGS. 1 and 2, a first exemplary embodiment of an integrated energy storage unit 100 includes a container 110 that retains a battery 120 housed within container 110, as well as a capacitor 130 housed within container 110, separate from battery 120. Container 110 may be a large format prismatic case that is well known to those skilled in the art.

An integrated cell electrical bus 112 is inserted over the top of container 110 to seal battery 120 and capacitor 130 within integrated energy storage unit 100 and to provide electrical contacts for an integrated battery electrical bus 114. As illustrated in FIG. 1, a plurality of integrated energy storage units 100 may be coupled together and housed inside a battery case 116 to form an integrated power unit 101. Integrated battery electrical bus 114 electrically couples all of integrated energy storage units 100 together and provides a single positive electrode 117 and a single negative electrode 118 for coupling to a charge source 50 (illustrated schematically in FIG. 2) or a device (not shown) to be powered by integrated power unit 101. Battery case 116 may also include a battery management space 119 to house a battery management system (not shown). The battery management system may include at least one controller electrically coupled to each of the plurality of integrated energy storage units 100 to manage the charging and discharging of the plurality of integrated energy storage units 100. A battery cover 121 is inserted over the top of battery case 116 to seal the plurality of integrated energy storage units 100 and the battery management system within battery case 116.

Compared to connecting a battery housed in one container to a capacitor housed in a second container, the present invention provides economic advantages of relatively lower cost of manufacture, lower packaging cost, better utilization of physical space, improved energy density, and better performance.

The present invention also provides energy management performance advantages of lower inductance, lower resistance, lower power dissipation from physically shorter, wider internal conductive paths and interconnections within and between battery(s) 120 and capacitor(s) 130 due to integration. The relative lower inductance and lower resistance of the present invention provides performance advantages of greater stability in energy level, faster response time, and greater efficiency in storing and delivering energy than prior art devices.

A benefit of the integration of battery 120 with capacitor 130 is related to the reduction in the length of electrical bus connection 112, relative to prior art connections. For example, prior art battery-to-capacitor electrical bus connections for quick release of power in the 100 amp to 150 amp range typically use copper or aluminum rectangular straps or bars that are several inches long, about an inch (2.54 cm) wide, and about ⅛ inch (0.32 cm) thick. Such a strap or bar typically results in at least 30 micro ohms of resistance and at least 30 micro henries of inductance, not including contact resistance. The inventive device, having electrical bus connection 112 length of a half to a third the length of prior art straps or bars, reduces the battery-to-capacitor connection resistance and inductance by a half to a third, down to between about 10 to about 15 micro ohms, and between about 10 and about 15 micro henries.

Battery 120 includes a plurality of positive plates 122 and a plurality of negative plates 124 (only one positive plate 122 and one negative plate 124 are shown for clarity) stored within a battery pouch 152. A positive battery terminal 126 is electrically coupled to the plurality of positive plates 122 and a negative battery terminal 127 is electrically coupled to the plurality of negative plates 124. While a single positive battery terminal 126 and a single negative battery terminal 127 are illustrated, those skilled In the art will recognize that battery 120 may include more than one positive battery terminal 126 and/or more than one negative battery terminal 127. A battery electrolyte 128 is in contact with positive plates 122 and negative plates 124 and is used to transport ions between positive plates 122 and negative plates 124. Battery 120 may be a rechargeable lithium-ion battery.

Capacitor 130 includes a positive plate 132 and a negative plate 134 stored within a capacitor pouch 154. A positive capacitor terminal 136 is electrically coupled to positive plate 132 and a negative battery terminal 137 is electrically coupled to negative plate 134. While a single positive capacitor terminal 136 and a single negative capacitor terminal 137 are illustrated, those skilled in the art will recognize that capacitor 130 may include more than one negative capacitor terminal 137. A capacitor electrolyte 138 is in contact with positive electrode 132 and negative electrode 134 and is used to transport electrons between positive electrode 132 and negative electrode 134. Capacitor electrolyte 138 may be an aqueous or a non-aqueous electrolyte.

Capacitor 130 may be an electrochemical double layer capacitor or a super capacitor, which are both well known in the art. Capacitor 130 may be manufactured in a roll-to-roll or other known coating manufacturing process. Carbon nanofoam powders, such as those provided by Ocellus, Inc. of Livermore, Calif., may be used in the manufacture of plates 132, 134 in capacitor 130. The surface area of the nanofoam powder ranges between about 2000 $m^2/g$ and about 2400 $m^2/g$.

In an exemplary embodiment, the coating may be formed by making a slurry with the nanofoam powder, a solvent, and a binder. The solvent may be water or other suitable solvent and the binder makes up less than 10% by weight, and more preferably, less than 5% by weight of the coating. The binder does not occlude the porosity in the nanofoam. The binder is comprised of water soluble polymers including carboxymethylcellulose, (CMC), poly vinyl alcohol, polyvinylpyrrolidone, poly acrylic acid, polymethacrylic acid, polyethylene oxide, polyacrylamide, poly-N-isopropylearylamide, Poly-N,N-dimethylacrylamide, polyethyleneimine, polyoxyethylene, polyvinylsulfonic acid, poly(2-methoxyethoxyethoxyethylene), styrene butadiene rubber (SBR), Butadiene-acrylonitrile, rubber (NBR) Hydrogenated NBR (HNBR), epichlorhydrin rubber (CHR), polytetrafluroethylene (PTFE), EPDM, and acrylate rubber (ACM). The water soluble thickener may be selected from the group consisting of natural cellulose, physically and/or chemically modified cellulose, natural polysaccharides, chemically and/or physically modified polysaccharides, carboxymethyl cellulose, hydroxy methyl cellulose and methyl ethyl hydroxy cellulose. The binder is also comprised of polymers soluble in organic solvents such as PVDF and its copolymers.

Connectors 140, 142 electrically couple battery 120 and capacitor 130 in parallel, forming integrated energy storage unit 100. Connector 140 may be electrically coupled to positive battery terminal 126 and positive capacitor terminal 136. Connector 140 may be electrically coupled to a positive lead 144, which extends outwardly from container 110. Connector 142 may be electrically coupled to negative battery terminal 127 and negative capacitor terminal 137. Connector 142 may be electrically coupled to a negative lead 146, which extends outwardly from container 110. A device (not shown) that is to be powered by integrated energy storage unit 100 may be electrically coupled to positive lead 144 and negative lead 146.

Integrated energy storage unit 100 according to the present invention allows for modularity in assembling integrated energy storage unit 100. For example, battery 120 may be a 3.2 volt battery and capacitor 130 may be a 1000 Farad capacitor. More specifically, a lithium iron phosphate battery may have a voltage between about 2.5 volts and about 3.6 volts, while a lithium nickel cobalt manganese battery may have a voltage between about 3 volts and about 4.2 volts. The inventive integrated energy storage unit 100 provides large independent capacitance, with the same characteristics of a super capacitor.

In an exemplary embodiment, it may be desired to provide integrated energy storage unit 100 having 460 volts and 100 Farad. In this embodiment, integrated energy storage unit 100 may include 144 batteries 120 and 144 capacitors 130.

Regardless of the number of batteries 120 and the number of capacitors 130 that comprise integrated power unit 101, it is desired that the capacitor internal resistance is not more than one half that of the battery internal resistance. In small duration high power pulses, battery 120 does not initially participate (i.e. charge state initially does not charge) due to slow ion mobility and high internal resistance compared to the much faster electron mobility and lower internal resistance of capacitor 130. Further, it is desired that the voltage limit of capacitor 130 is greater than the voltage of battery 120.

Figure 3:
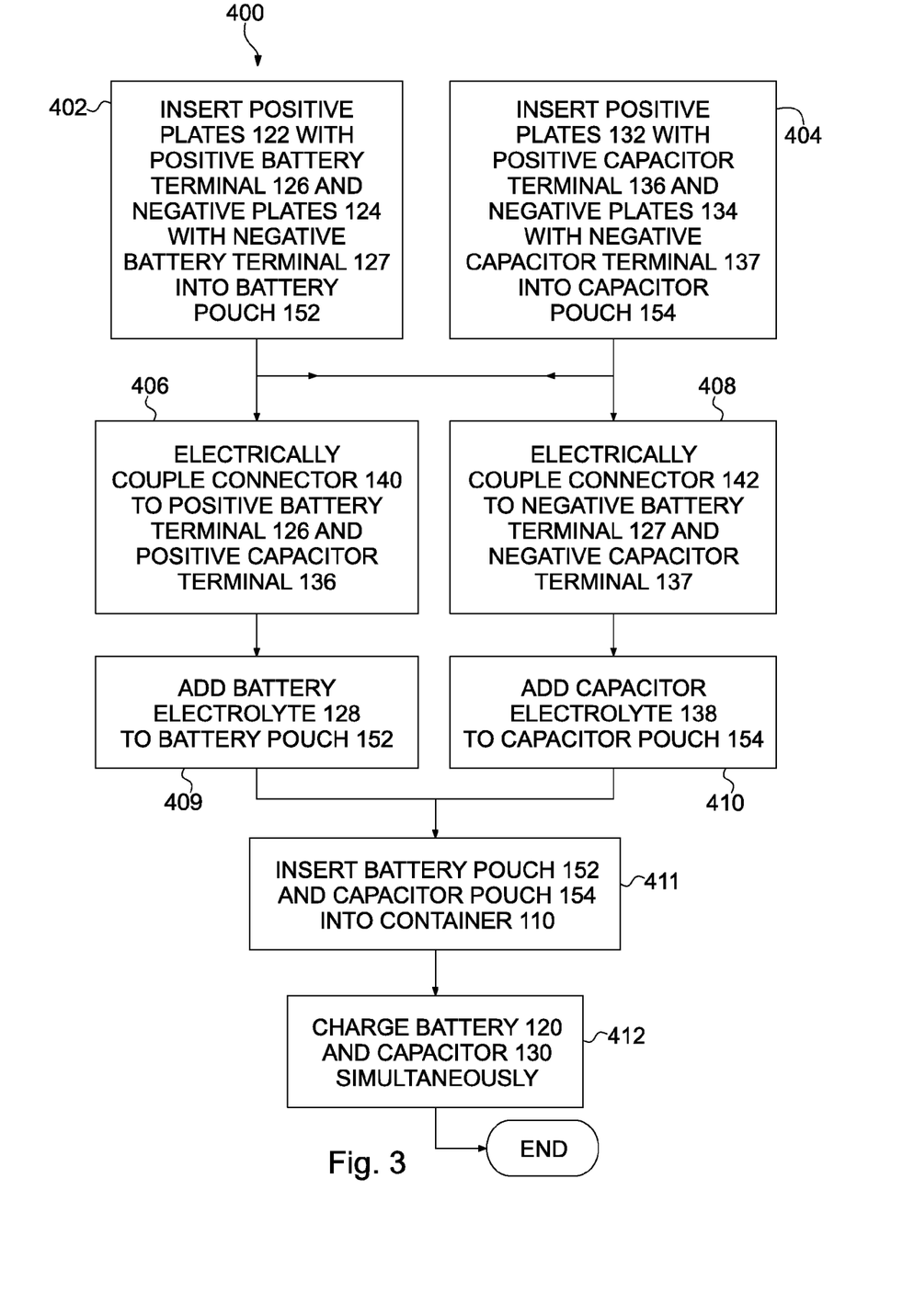
FIG. 3 is a flowchart illustrating an exemplary method of manufacturing an integrated energy storage unit according to an exemplary embodiment of the present invention.

In an exemplary embodiment of a method of manufacturing integrated energy storage unit 100, illustrated in the flowchart 400 of FIG. 3, in step 402, battery 120 may be manufactured by inserting the plurality of positive plates 122 with positive battery terminal 126 and the plurality of negative plates 124 with negative battery terminal 127 into battery pouch 152. In step 404, capacitor 130 may be manufactured concurrently but separately from battery 120 by inserting the plurality of positive plates 132 with positive capacitor terminal 136 and the plurality of negative plates 134 with negative capacitor terminal 137 into capacitor pouch 154.

In step 406, connector 140 may be electrically coupled to positive battery terminal 126 and positive capacitor terminal 136. In step 408, connector 142 may be electrically coupled to negative battery terminal 127 and negative capacitor terminal 137. In step 409, battery electrolyte 128 may be added to battery pouch 152. In step 410, capacitor electrolyte 138 may be added to capacitor pouch 154. In step 411, battery pouch 152 and capacitor pouch 154 may be inserted into container 110. In step 412, both battery 120 and capacitor 130 are simultaneously charged from a charge source 50.

In the embodiment of integrated energy storage unit 100 illustrated in FIG. 1, prior to adding electrolytes 128, 138, battery 120 may be electrically coupled to capacitor 130, as discussed above in steps 406-410. Alternatively, battery electrolyte 128 may be added to battery pouch 152 and capacitor electrolyte 138 may be added to capacitor pouch 154 prior to electrically coupling battery 120 to capacitor 130.

Integrated energy storage unit 100 provides a more complete and stable formation of a lithium battery than if a lithium battery were formed alone. In an experiment, six unformed 40 Ampere hour (Ah) lithium iron phosphate (LFP40) test cells (see Table I below) were each electrically coupled to separate uncharged capacitors and formed according to the present invention, and six other cells out of the same lot were formed alone as control cells (see Table II below). After formation, the capacitors were removed from the six test cells for C/3 (3 hour) discharge tests. The C/3 discharge test data results show that the six test cells formed with a capacitor out-performed the six control cells that were formed alone.

TABLE I

Test Cells Formed with Capacitor (w/Cap) - C/3 Cycle Test Results Capacitor removed prior to cycling

| | Formed w/Cap Test Cell#: | | | | | |
|---|---|---|---|---|---|---|
| Cycle number (no Cap) | 09243-21 Ah @C/3 | 09243-22 Ah @C/3 | 09243-23 Ah @C/3 | 09243-24 Ah @C/3 | 09243-26 Ah @C/3 | 09243-27 Ah @C/3 |
| 1 | 40.374 | 40.36 | 40.845 | 40.446 | 40.577 | 40.469 |
| 2 | 40.561 | 40.551 | 40.989 | 40.577 | 40.749 | 40.646 |
| 3 | 40.718 | 40.713 | 41.122 | 40.729 | 40.887 | 40.792 |
| 4 | 40.947 | 40.944 | 41.370 | 40.963 | 41.115 | 41.029 |
| 5 | 41.058 | 41.064 | 41.469 | 41.078 | 41.213 | 41.136 |
| 1st Cycle Ah/5th Cycle Ah %: | 98.33% | 98.28% | 98.50% | 98.46% | 98.46% | 98.38% |
| 1st Cycle/5th Cycle Ah Avg %: | | | 98.40% | | | |
| 5 Cycle Avg. Ah and variation | | | 41.170Ah + .299, −.112 | | | |
| % Variation from 5 cycle Avg. | | | 1.00% | | | |

TABLE II

Control Cells Formed Alone - C/3 Cycle Test Results

| | Formed Alone Control Cell #: | | | | | |
|---|---|---|---|---|---|---|
| Cycle number | 09243-13 Ah @C/3 | 09243-14 Ah @C/3 | 09243-17 Ah @C/3 | 09243-18 Ah @C/3 | 09243-19 Ah @C/3 | 09243-20 Ah @C/3 |
| 1 | 39.064 | 40.035 | 40.137 | 39.973 | 39.931 | 39.182 |
| 2 | 39.649 | 40.583 | 40.649 | 40.579 | 40.468 | 39.694 |
| 3 | 40.100 | 40.992 | 41.039 | 41.018 | 40.864 | 40.099 |
| 4 | 40.392 | 41.235 | 41.266 | 41.271 | 41.095 | 40.350 |
| 5 | 40.626 | 41.468 | 41.482 | 41.514 | 41.305 | 40.560 |
| 1st Cycle Ah/ 5th Cycle Ah %: | 96.16% | 96.54% | 96.76% | 96.29% | 96.67% | 96.60% |
| 1st Cycle/ 5th Cycle Ah Avg %: | | | 96.50% | | | |
| 5 Cycle Avg. Ah and variation | | | 41.160Ah + .354, −.600 | | | |
| % Variation from 5 cycle Avg. | | | 2.32% | | | |

For the control cells, their first cycle average capacity was 96.5% of their fifth cycle capacity, while for the test cells, their first cycle average capacity was 98.4% of their fifth cycle capacity, which showed a 1.9% improvement. Both test and control cells on average achieved the same capacity by the fifth cycle; both above their 40 Ah rating by about 1.17 Ah or by 2.9%. All test cells, however, achieved rated capacity in the first cycle, while the control cells took until the third cycle for all to achieve rated capacity. Also the test cells showed less variation (1.00 percent) from average capacity than control cells (2.32 percent).

The test cells also had a lower average impedance and slightly less variation at the 5$^{th}$ cycle compared to the control cells. Tables III and IV below show that the 5th cycle impedance average for the test cells (Table III) was 1.5813 mOhm compared to 1.6843 mOhm for the controls cells (Table IV), which is 0.103 mOhm (6.1%) lower.

TABLE III

LFP40 Test Cells Formed w/Cap 5th Cycle Cell Impedance milliOhm @ 50 Hz
Capacitor removed prior to cycling

| Formed w/Cap Test Cell#: | mOhm |
|---|---|
| 09243-21 | 1.562 |
| 09243-22 | 1.561 |
| 09243-23 | 1.580 |
| 09243-24 | 1.615 |
| 09243-26 | 1.612 |
| 09243-27 | 1.557 |
| 5th Cycle Avg. and Variation: | 1.5813 + .0337, −0.0243 |
| % Variation from Avg. | 3.67% |

TABLE IV

FP40 Test Cells Formed Alone 5th Cycle Cell Impedance milliOhm@ 50 Hz

| Formed Alone Control Cell#: | mOhm |
|---|---|
| 09243-13 | 1.651 |
| 09243-14 | 1.675 |
| 09243-17 | 1.659 |
| 09243-18 | 1.700 |
| 09243-19 | 1.705 |
| 09243-20 | 1.716 |
| 5th Cycle Avg. and Variation | 1.6843 + .0317, −.0333 |
| % Variation from Avg. | 3.86% |

Figure 4:
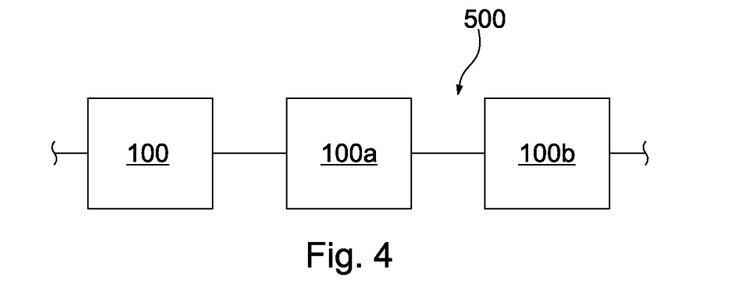
FIG. 4 is an electrical schematic drawing of a plurality of integrated energy storage units electrically coupled to each other in series according to an exemplary embodiment of the present invention.

As shown in FIG. 4, a plurality of integrated energy storage units 100, 100a, 100b may be coupled together in series, forming a power unit 500. Each integrated energy storage unit 100, 100a, 100b may be charged separately prior to electrically coupling power unit 500 to other devices (not shown), such as, for example, an electric or hybrid vehicle motor.

Figure 5:
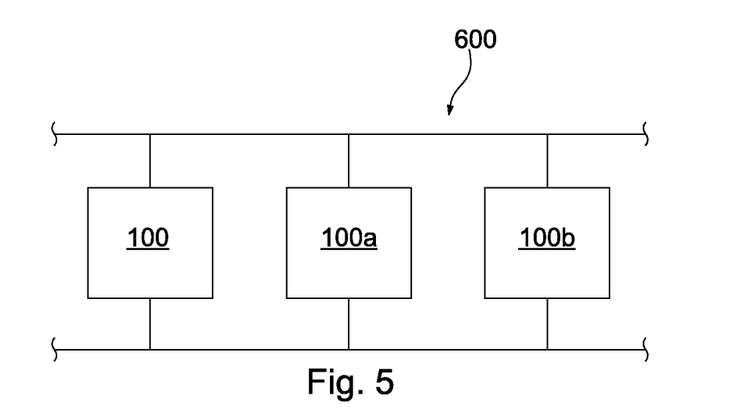
FIG. 5 is an electrical schematic drawing of a plurality of integrated energy storage units electrically coupled to each other in parallel according to an exemplary embodiment of the present invention.

Alternatively, as shown in FIG. 5, a plurality of integrated energy storage units 100, 100a, 100b may be coupled together in parallel, forming a power unit 600. Each integrated energy storage unit 100, 100a, 100b may be charged separately prior to electrically coupling power unit 600 to other devices (not shown), such as, for example, an electric or hybrid vehicle motor. The coupling of integrated energy storage units 100, 100a, 100b in series, parallel, or even a combination of series and parallel is performed to provide a desired voltage or current, depending on the intended use of the device.

With battery 120 and capacitor 130 electrically coupled together to form integrated energy storage unit 100, battery 120 and capacitor 130 may be controlled together by a battery management system (not shown). Prior art assemblies using capacitors and batteries as individual strings require different balancing systems, one for the capacitors and one for the batteries. With the hybrid system according to the present invention, a single balancing system manages both.

Some advantages of using integrated energy storage units 100, 200 300, and 500 include increasing the initial charge and discharge capacity and achieving the rated capacity in the first charge cycle, which results in reduced cycling time which lowers manufacturing cost.

While the principles of the invention have been described above in connection with preferred embodiments, it is to be clearly understood that this description is made only by way of example and not as a limitation of the scope of the invention.

What is claimed is:

1. An integrated energy storage unit comprising:
a container electrically coupled to an energy storage management system;
a rechargeable battery housed within a battery pouch within the container, the battery comprising:
one or more positive battery plates coupled to a positive battery terminal;
one or more negative battery plates coupled to a negative battery terminal;
a battery electrolyte;
a capacitor housed within a capacitor pouch within the container, separate from the battery, the capacitor having a higher voltage rating than the voltage rating of the battery and the capacitor having an internal resistance less than one half of the internal resistance of the battery comprising:
a positive capacitor terminal;
a negative capacitor terminal;
a capacitor electrolyte different from said battery electrolyte;
a plurality of connectors electrically coupling the battery and the capacitor in parallel;
a positive lead electrically coupled to the positive battery terminal and the positive capacitor terminal, the positive lead extending from the container; and
a negative lead electrically coupled to the negative battery terminal and the negative capacitor terminal, the negative lead extending from the container.

2. The integrated energy storage unit according to claim 1, wherein the battery comprises a plurality of batteries electrically coupled to each other in parallel.

3. The integrated energy storage unit according to claim 1, wherein the capacitor comprises a plurality of capacitors electrically coupled to each other in series.

4. The integrated energy storage unit according to claim 1, wherein said capacitor includes at least one positive capacitor plate and at least one negative capacitor plate.

5. The integrated energy storage unit according to claim 4, wherein at least one of said capacitor plates has a coating thereon which includes a nanofoam powder with a porosity and a binder that exhibits limited occluding of the porosity the nanofoam.

6. The integrated energy storage unit according to claim 5, wherein said nanofoam powder has a surface area in the range of about 2,000 to about 2,400 $m^2/g$.

7. An integrated energy storage unit comprising:
a container electrically coupled to an energy storage management system;
a rechargeable battery assembly comprising a plurality of batteries housed within the container, the plurality of batteries electrically coupled together in parallel, each battery having plates housed within a battery pouch which contains a battery electrolyte; and
a capacitor assembly comprising a plurality of capacitors housed within the container, each capacitor being housed within a capacitor pouch containing a capacitor electrolyte different from the battery electrolyte, the plurality of capacitors electrically coupled together in series, the plurality of capacitors in the aggregate having a higher voltage rating than the plurality of batteries and the plurality of capacitors in the aggregate having an internal resistance less than one half of the internal resistance of the plurality of the batteries,
wherein the battery assembly and the capacitor assembly are electrically coupled to each other in parallel.

8. The integrated energy storage unit according to claim 7, wherein said capacitor includes at least one positive capacitor plate and at least one negative capacitor plate.

9. The integrated energy storage unit according to claim 8, wherein at least one of said capacitor plates has a coating thereon which includes:
a nanofoam powder with a surface area in the range of about 2,000 to about 2,400 $m^2/g$ and a porosity; and
a binder that exhibits limited occluding of the porosity the nanofoam.

10. An integrated energy storage unit comprising:
a plurality of rechargeable batteries electrically coupled together in parallel, each of the plurality of batteries having plates housed in its own battery pouch which contains a battery electrolyte; and
a plurality of capacitors electrically coupled together in series, each of the plurality of capacitors being housed in its own capacitor pouch containing a capacitor electrolyte different from the battery electrolyte, the plurality of capacitors in the aggregate having a higher voltage rating than the plurality of batteries and the plurality of capacitors in the aggregate having an internal resistance less than one half of the internal resistance of the plurality of the batteries;
wherein the plurality of batteries are electrically coupled to the plurality of capacitors in parallel and the combination of the plurality of batteries and plurality of capacitors electrically coupled to an energy storage management system.

11. The integrated energy storage unit according to claim 10, wherein the plurality of capacitors in series have a total capacitor voltage capacity, and wherein the plurality of batteries in parallel have a total battery voltage capacity equal to or less than the total capacitor voltage capacity.

12. The integrated energy storage unit according to claim 10, wherein said capacitor includes at least one positive capacitor plate and at least one negative capacitor plate .

13. The integrated energy storage unit according to claim 12, wherein at least one of said capacitor plates has a coating thereon which includes:
a nanofoam powder with a surface area in the range of about 2,000 to about 2,400 $m^2/g$ and a porosity; and
a binder that exhibits limited occluding of the porosity the nanofoam.

* * * * *